US005448134A

United States Patent [19]

Van Engelshoven

[11] Patent Number: 5,448,134
[45] Date of Patent: Sep. 5, 1995

[54] CATHODE RAY TUBE HAVING IMPROVED STRUCTURE FOR CONTROLLING IMAGE QUALITY

[75] Inventor: Jeroen Van Engelshoven, Eindhoven, Netherlands

[73] Assignee: U.S. Philips Corporation, New York, N.Y.

[21] Appl. No.: 115,339

[22] Filed: Sep. 1, 1993

[30] Foreign Application Priority Data

Sep. 25, 1992 [EP] European Pat. Off. .......... 92202947

[51] Int. Cl.[6] .................... H01J 29/46; H01J 29/50; G01G 1/04

[52] U.S. Cl. .............................. 315/14; 315/382; 313/414; 313/441; 313/448

[58] Field of Search ................ 315/382, 14; 313/447, 313/441, 409, 414, 448

[56] References Cited

U.S. PATENT DOCUMENTS

| | | | |
|---|---|---|---|
| 4,318,027 | 3/1982 | Hughes et al. | 315/15 |
| 4,529,910 | 7/1985 | Garewal et al. | 315/15 |
| 4,764,704 | 8/1988 | New et al. | 313/414 |
| 5,287,038 | 2/1994 | Hagar et al. | 315/15 |

*Primary Examiner*—Gregory C. Issing
*Attorney, Agent, or Firm*—Paul R. Miller

[57] ABSTRACT

A cathode ray tube having an electron gun for relatively low beam currents (less than 1 mA) is shown. The electron gun has a G1 and a G2 electrode. The voltage difference between these electrodes is more than 800 Volt and the electrical field strength $E_{12}$ between said electrodes is more than 4 keV/mm. An improvement in spot size is thereby obtained.

11 Claims, 3 Drawing Sheets

CATHODE RAY TUBE HAVING IMPROVED STRUCTURE FOR CONTROLLING IMAGE QUALITY

The invention relates to a cathode ray tube device comprising a cathode ray tube comprising, in an evacuated envelope, means to generate at least one electron beam behind which means, viewed in the direction of propagation of the electron beam, are provided successively a control electrode, an accelerating pre-focusing lens comprising a first and second lens electrode, each of the electrodes having an aperture for passing the at least one electron beam, and a main focusing lens, the device further comprising means to supply electric voltages to the electrodes, the cathode ray tube further comprising a phosphor screen on the inside of the evacuated envelope.

Such devices are known and used for instance for displaying monochromatic or multicolour pictures, for example television pictures.

Within the framework of the invention it has been found that, for some display devices, for those in which electron beams with relatively small beam currents (smaller than 1 mA) are formed, the spot quality can be improved vis-a-vis the known devices. Devices in which beams with a relatively small beam current are formed are also called "low-current cathode ray tubes". In such currently known display tubes, e.g. colour monitor tubes (CMT's), typically beams with a maximum beam current of approximately 400 mA are generated in operation. By limiting the beam current a small spot size can be attained. Small spot sizes enable a high definition picture to be made. Spot sizes, meaning the average size of the spot at the centre of the phosphor screen within which 95% of all electrons of the beam hit the screen, of less than approximately 0.75 mm are attainable with known devices. Increasing the beam current has an advantage because it increases the brightness of the spot. An increased brightness of the spot is advantageous because e.g. an increase of contrast of the displayed images can be obtained, or a darker glass can be used for the envelope, which improves the image quality. However, with the known device design also the spot size is increased, which decreases the image quality. For known devices the beneficial effects of an increased beam current are negated by the negative effect of the increased spot size. It is an object of the present invention to achieve an improvement of the image quality.

A display device according to the invention is characterized in that the means to supply voltages to the electrodes comprise means to supply a voltage difference $V_{12}$ between the control electrode and the first lens electrode, $V_{12}$, being greater than 800 Volt, and in that $V_{G2}/S_{12}$ is greater than 4 kV/mm, $S_{12}$ being the distance between the control electrode and the first electrode and in that in operation the beam current is limited to an upper limit of 1 mA.

The following effect occurs due to the electrical field between the control electrode and the first electrode. The outermost rays of an electron beam emitted by the means for generating an electron beam are more focused than the paraxial rays by the electrical fields between the control electrode and the first lens electrode. A cross-over is thereby formed. The invention is amongst others based on the insight that for beam currents of the order of 0.5 to 1 mA the crossover occurs at a potential approximately around 800 V, and that the crossover location in space is amongst others dependant on the voltage difference $V_{G2}$ between the control electrode and the first lens electrode. The voltage difference between the control electrode and the first lens electrode in current designs of low-current cathode ray tubes is approximately 500 V, and the field strength $E_{12}$ between the control electrode and the first electrode is approximately 2.5 kV/mm. Such a voltage difference between the control electrode and the first lens electrode combined with such a field strength results in a crossover location approximately at a position underneath the first lens electrode. A voltage difference of more than 800 Volts and a field strength between the control electrode and the first electrode of more than 4 kV/mm (as in the present invention) leads to a crossover at a position in between the control electrode and the first electrode. Under such conditions an improvement of the spot size is achieved, in particular for electron beams having a beam current of approximately 0.8 mA, a spot size of less than 0.75 mm is obtained. Thus the beam current has been increased relative to the known devices, whereas the spot size has not been increased, resulting in an improved image quality. Preferably the field strength is larger than 6 kV/mm and smaller than 9 kV/mm.

A preferred embodiment is characterized in that the aperture size of the aperture in the control electrode is less than approximately 500 μm.

Within the framework of the invention it has been found that spot sizes increase with increasing aperture size in the control electrode. For apertures larger than 500 μm very high voltages and/or field strengths are necessary to achieve spot sizes of less than 0.75 mm.

A further preferred embodiment is characterized in that the aperture size of the aperture in the control electrode is larger than approximately 150 μm.

If the aperture size becomes less than 150 μm then either the distance between the control electrode and the means for generating the electron beam and/or the thickness of the control electrode have, in order to obtain a beam current of 0.8 mA, to be reduced to such small values that either there is a great risk of incidental electrical contact between the control electrode and the means for generating the electron beams or the mechanical strength of the control electrode is inferior.

With aperture size (d) is meant to be the size of the aperture, i.e. the square root of the area (A) of the aperture divided by $\pi/4$, or $(d)=\sqrt{(4A/\pi)}$. For a circular aperture the aperture $$\sqrt{(4A/\pi)}$$

size equals the diameter.

These and other aspects of the invention will be apparent from and elucidated with references to the embodiments described hereinafter.

The figures are schematic, simplified and not drawn to scale.

Figure 1:
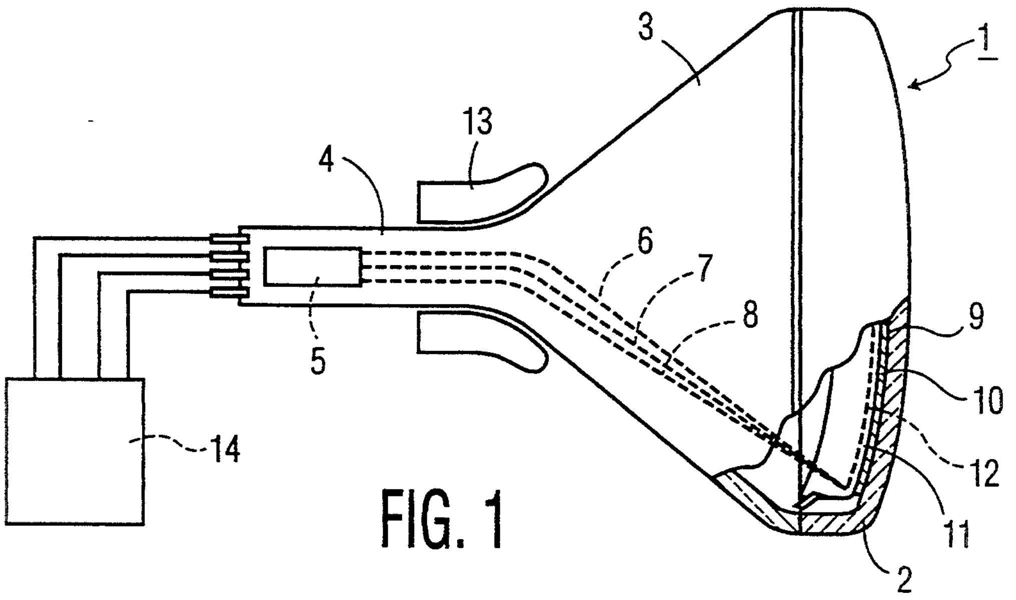
FIG. 1 is a horizontal longitudinal sectional view through a cathode-ray tube for use in a display device according to the invention.

FIG. 1 is a horizontal longitudinal sectional view of a cathode ray tube for a device according to the invention. In this example the cathode ray tube is a colour cathode my tube for use in a device for displaying colour pictures. Provided in the neck of a glass envelope 1 which comprises a display window 2, a cone 3 and the neck 4 is an electron gun system 5 which generates three electron beams 6, 7 and 8 which, in this example, are situated with their axes in one plane (for example the plane of drawing). The axis of the central electron beam 7 approximately coincides, when undetected, with the tube axis. The display window 2 comprises on its inside surface 9 a display screen 10 which display screen comprises, for example, a great number of triplet phosphor lines. Each triplet comprises a line consisting of a blue-luminescing phosphor, a line consisting of a red-luminescing phosphor, and a line consisting of a green-luminescing phosphor. The phosphor lines are, for example, substantially perpendicular to the plane of drawing. Positioned in front of the display screen 10 is a shadow mask 11 in which a large number of apertures 12 is provided through which the electron beams 6, 7 and 8 pass which each impinge only upon phosphor lines of one colour. The three electron beams situated in one plane are deflected by the system of deflection coils 13. The invention is not restricted to the type of device shown, it may for instance be used in a device having a mono-chromatic cathode ray tube or a camera tube. The device further comprises means for supplying electric voltages to the electrodes. In FIG. 1 these means are schematically indicated by means 14.

Figure 2:
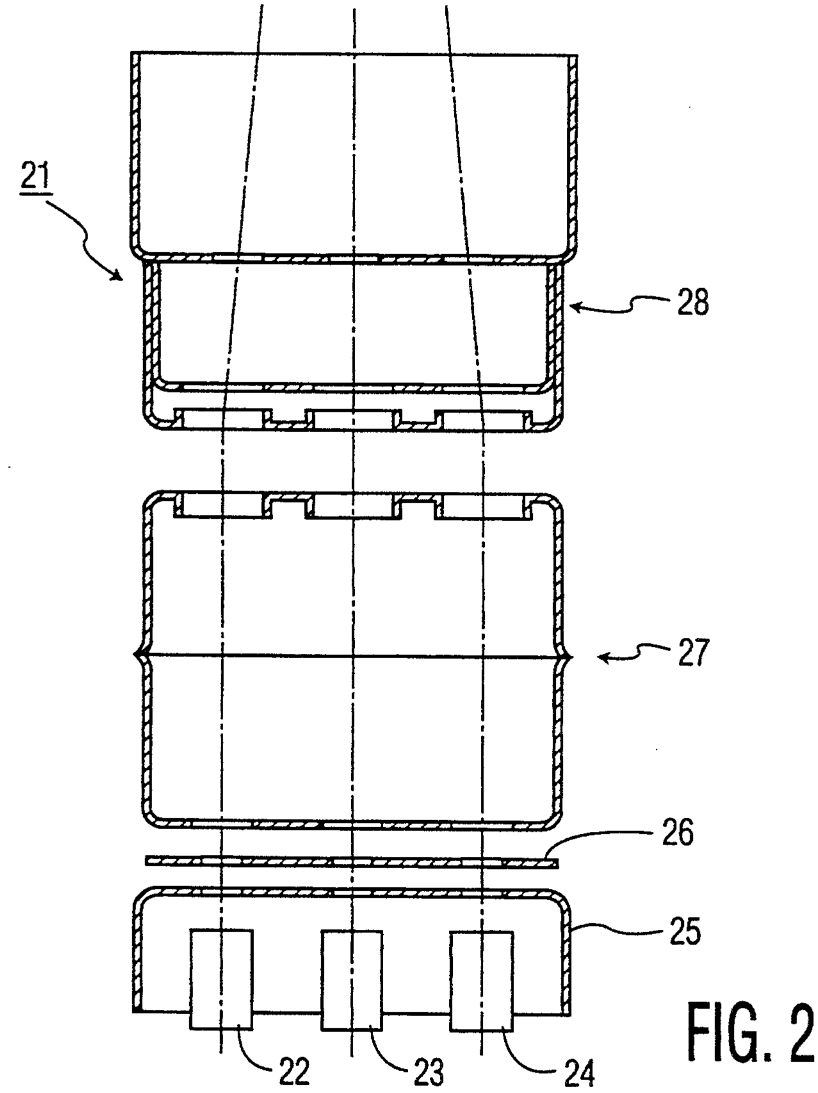
FIG. 2 is a longitudinal sectional view through an electron gun as used in the display device shown in FIG. 1.

FIG. 2 is a longitudinal sectional view through an electron gun 21 as used in the examplary display device shown in FIG. 1.

The electron gun 21 comprises a means for generating at least one electron beam. In this example it comprises three cathodes 22, 23 and 24 for generating three electron beams 6, 7 and 8. The electron gun further comprises a control electrode 25 which in this example is a joint electrode for the three electron beams. It further comprises a first lens electrode 26 and a second lens electrode 27. The first and second electrode 26, 27 form a pre-focusing lens. The electron gun further comprises an electrode 28. The electrodes 27 and 28 form a main lens. Each electrode has apertures for passing the electron beams. The control electrode 25 is customarily called the $G_1$-electrode, the first lens electrode is customarily called the $G_2$-electrode.

Figure 3:
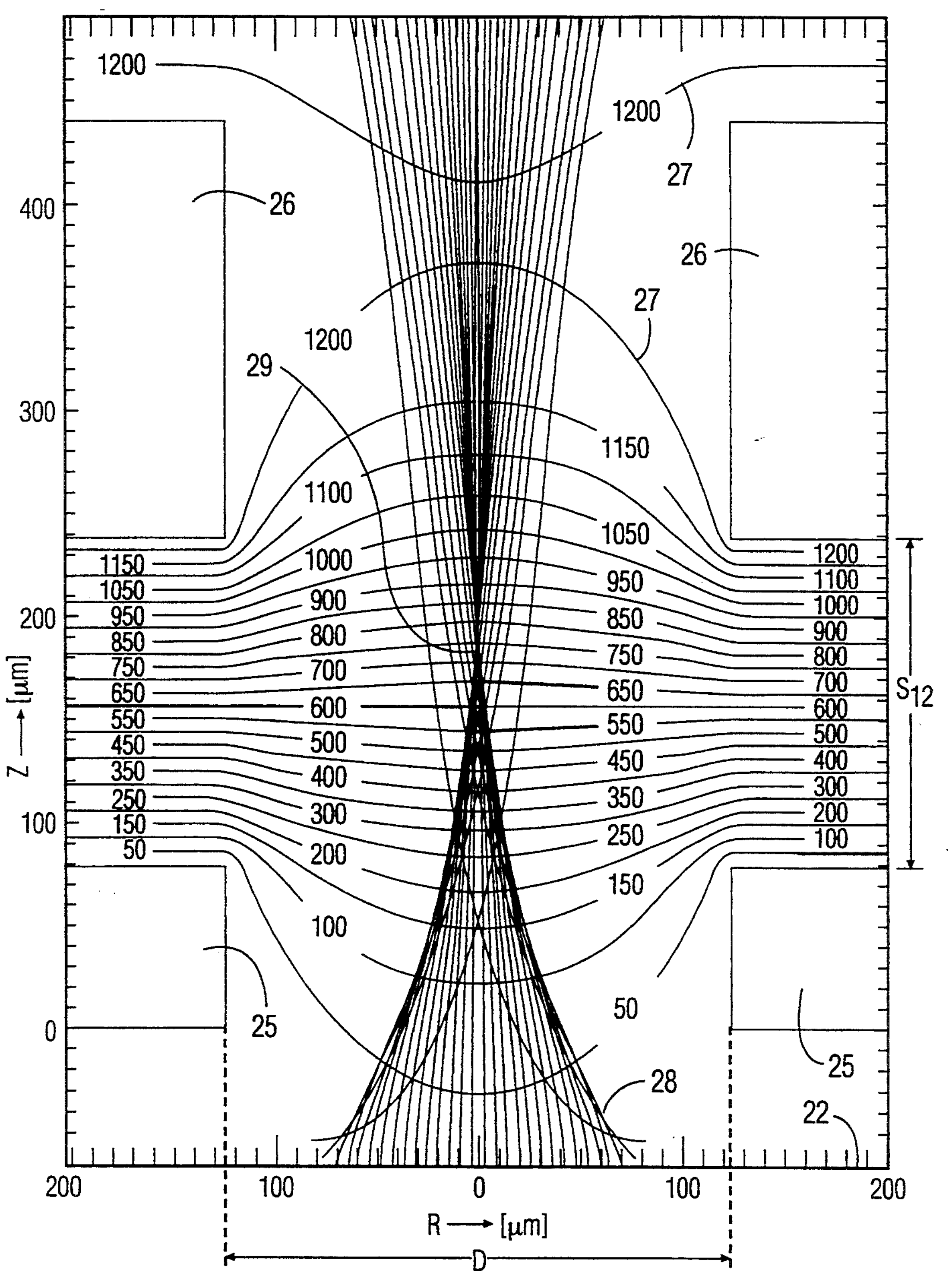
FIG. 3 shows a close-up detail of the electron gun shown in FIG. 2.

FIG. 3 shows schematically a close-up detail of the electron gun shown in FIG. 2.

Shown are, in this example, the emitting surface of cathode 22, the electrodes 26 and 25 and the equipotential lines 27. The potential of the equipotential lines is indicated. The diameter of the aperture in electrode 25 is indicated. The size D of the aperture in the control electrode in this example is approximately 250 $\mu$m. The size of the aperture is to be understood to mean the average size of the aperture defined by the square root of the area of the aperture divided by $\pi/4$. For a circular aperture the size of the aperture is equal to the diameter. However, the invention is not restricted to circular apertures. The aperture in control electrode 25 can be for instance oval or rectangular.

In FIG. 3 the trajectories of electrons 28 emitted by the emitting surface of cathode 22 are shown for a beam current of 0.8 mA. It is shown in FIG. 3 that the outermost electrons cross each other before paraxial electron, i.e. electrons that are emitted near the centre of the cathode, cross each other. A so-called cross-over point is formed approximately at point 29. This point lies slightly below the 800 Volt equipotential line. According to a preferred embodiment of the invention the potential difference between control electrode 25 and first lens electrode 26 is greater than 800 V, in this example approximately 1200 Volt. The distance between the electrodes 25 and 26, in FIG. 3 indicated by $s_{12}$, is (given in mm) less than 1200 Volt/4 kV/mm=0.300 mm. In this example $s_{12}$ is approximately 0.160 mm.

In the framework of the invention it has been found that the crossover occurs at a potential approximately around 800 V, and that the crossover location in space is amongst others dependant on the voltage difference between the control electrode and the first lens electrode. The voltage on the first lens electrode in known devices is typically approximately 500 Volt. A voltage difference between the control electrode and the first lens electrode of this magnitude combined with a relatively low field strength (smaller than 4 kV/mm) results in a crossover location 29 approximately underneath the first electrode 26. A voltage difference of more than 800 V and a field strength between the control electrode and the first electrode of more than 4 kV/mm leads to a crossover in between the control electrode and the first electrode (see e.g. FIG. 3). In the framework of the invention it has been found that under such conditions an improvement of the spotsize is achieved.

This is illustrated in Table 1 below. In this table for different electron guns the diameter of the aperture in the control electrode 25 is given (in Table 1 denoted by G1 diameter), as well as the voltage difference between the control electrode 25 and the first lens electrode 26 ($V_{G2}$), and the ratio of this voltage and the distance between the control electrode and the first lens electrode ($=E_{12}=V_{G2}/S_{12}$).

TABLE 1

| gun # | #1 | #2 | #3 | #4 |
|---|---|---|---|---|
| G1 diameter [mm] | .35 | .25 | .20 | .15 |
| $E_{12}$ [kV/mm] | 2.8 | 7.7 | 6.8 | 6.1 |
| $V_{G2}$ [V] | 552 | 1239 | 1231 | 601 |
| 0.8 mA 5% spot [mm] | .90 | .70 | .68 | .77 |

The last line of Table 1 gives the spotsize on the screen for an electron beam with a beam current of 0.8 mA. The denotation 5% spot means that within the given diameter 95% of all electrons in the electron beam hit the screen. Below this will, for simplicity, also be called "the spot size".

Table 1 shows that making $V_{G2}$ to be above 800 V and $E_{12}$ to be larger than 4 kV/mm reduces the spotsize.

Figure 4:
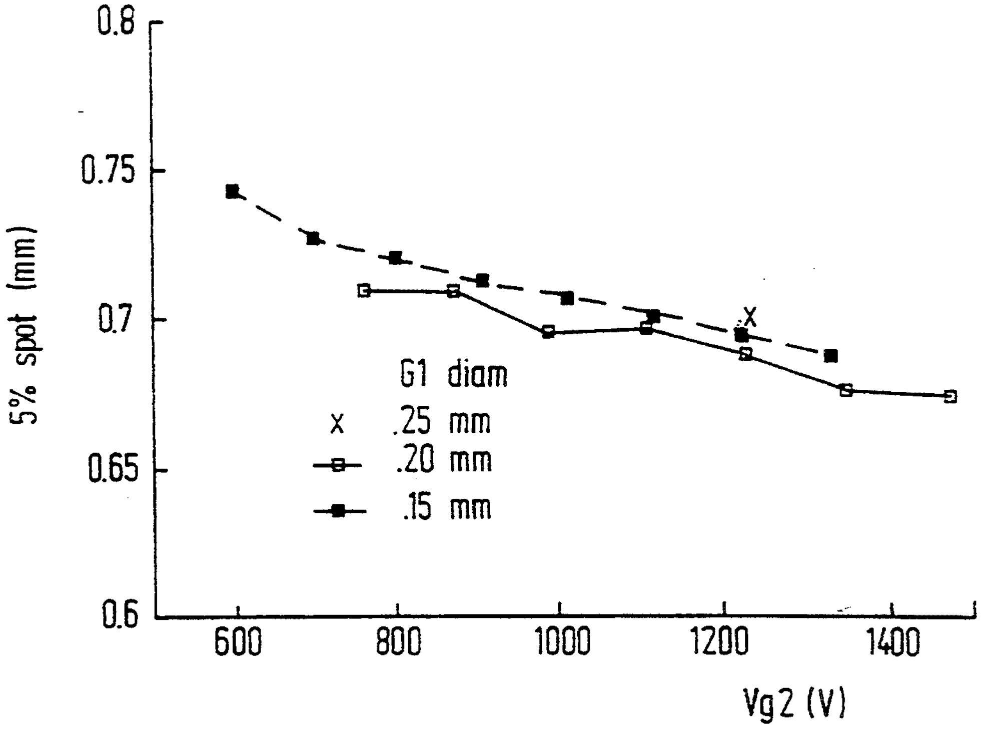
FIG. 4 shows in a graphical form the spot size as a function of voltage.
Figure 5:
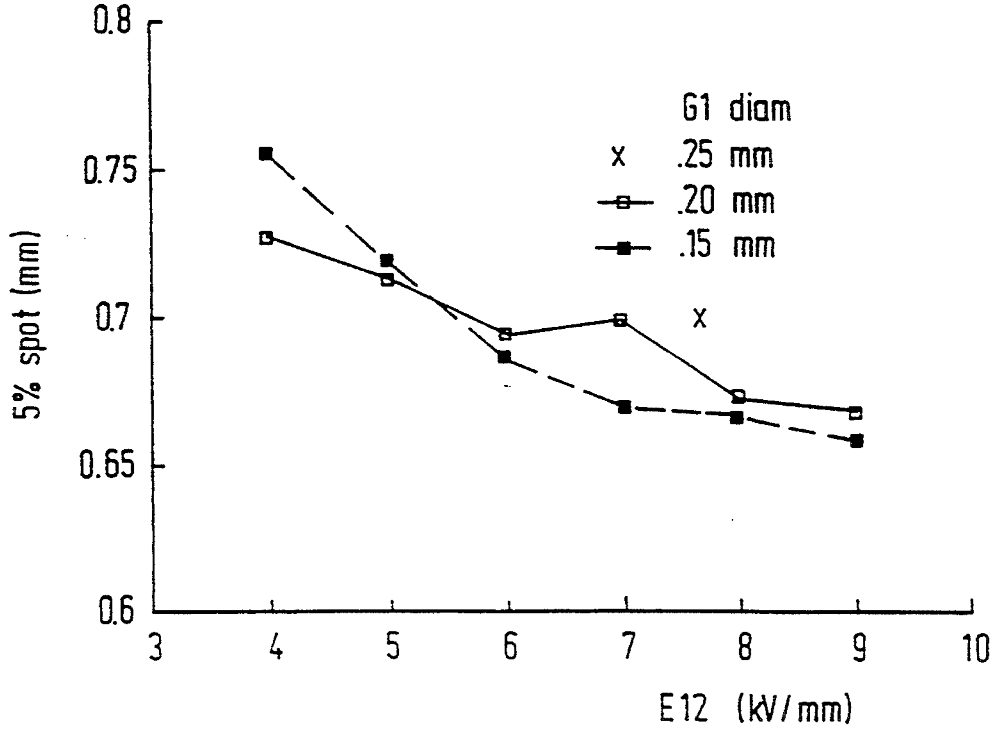
FIG. 5 shows in a graphical the spot size as a function of field strength.

FIG. 4 shows the spotsize of a 0.8 mA electron beam for a fixed field strength $E_{12}$ of 7.7 keV/mm as a function of the voltage difference $V_{G2}$. FIG. 5 shows, for a fixed voltage difference of $V_{G2}$ of 1239 V, the spot size as a function of the field strength $E_{12}$. Crosses indicate that the diameter of the aperture in G1 is 250 $\mu$m, open squares indicate that the diameter is 200 $\mu$m, full squares that the diameter is 150 $\mu$m.

Preferably the field strength $E_{12}$ is larger than 6 keV/mm. Between 4 and 6 keV/mm the spot size decreases whereas above 6 keV/mm the decrease is less prominent. Preferably $E_{12}$ is less than 9 keV/mm. For values higher than 9 keV/mm the decrease in spot size is small, however, the chance that arcing between electrodes G1 and G2 occurs is relatively high. Arcing may damage the electrodes.

The spot size is to a small degree dependent on the diameter of the aperture in electrode G1. Preferably the aperture is smaller than 500 μm.

Preferably the diameter is larger than 150 μm. If the aperture size becomes less than 150 μm than either the distance between the control electrode and the means for generating the electron beam and/or the thickness of the control electrode have, in order to obtain reasonable beam currents, to be reduced to such small values that either there is a great risk of incidental electrical contact between the control electrode and the means for generating the electron beams or the mechanical strength of the control electrode is inferior.

I claim:

1. A cathode ray-tube device comprising a cathode ray tube comprising in an evacuated envelope means to generate at least one electron beam behind which means, viewed in the direction of propagation of the electron beam, are provided successively a control electrode, an accelerating pre-focusing lens comprising a first and second lens electrode, each of said electrodes having an aperture for passing the at least one electron beam, and a main focusing lens, the device further comprising means to supply electric voltages to the electrodes, the cathode ray tube further comprising a phosphor screen on the inside of the evacuated envelope, characterized in that the means to supply voltages to the electrodes comprise means to supply a voltage difference $V_{G2}$ between the control electrode and the first lens electrode, $V_{G2}$ being greater than 800 Volt, and in that $V_{G2}/S_{12}$ is greater than 4 kV/mm, $S_{12}$ being the distance between the control electrode and the first electrode and in that in operation the beam current of the electron beam is limited to an upper limit of approximately 1 mA.

2. Cathode-ray tube device as claimed in claim 1, characterized in that $V_{G2}/S_{12}$ is greater than 6 kV/mm.

3. Cathode-ray tube device as claimed in claim 2, characterized in that $V_{G2}/S_{12}$ is smaller than 9 kV/mm.

4. Cathode-ray tube device as claimed in claim 3, characterized in that the aperture size of the control electrode is smaller than 0.5 mm.

5. Cathode ray tube as claimed in claim 4, characterized in that the aperture size of the control electrode is greater than 0.15 mm.

6. Cathode-ray tube device as claimed in claim 1, characterized in that $V_{G2}/S_{12}$ is smaller than 9 kV/mm.

7. Cathode-ray tube device as claimed in claim 2, characterized in that the aperture size of the control electrode is smaller than 0.5 mm.

8. Cathode-ray tube device as claimed in claim 1, characterized in that the aperture size of the control electrode is smaller than 0.5 mm.

9. Cathode ray tube as claimed in claim 3, characterized in that the aperture size of the control electrode is greater than 0.15 mm.

10. Cathode ray tube as claimed in claim 2, characterized in that the aperture size of the control electrode is greater than 0.15 mm.

11. Cathode ray tube as claimed in claim 1, characterized in that the aperture size of the control electrode is greater than 0.15 mm.

* * * * *